United States Patent
Chopra et al.

(10) Patent No.: US 7,352,501 B2
(45) Date of Patent: Apr. 1, 2008

(54) ELECTROPHORETIC CAPS PREPARED FROM ENCAPSULATED ELECTROPHORETIC PARTICLES

(75) Inventors: Naveen Chopra, Oakville (CA); Georgeta Masson, Toronto (CA); Peter G. Odell, Mississauga (CA); Peter M. Kazmaier, Mississauga (CA); Man-Chung Tam, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/095,823

(22) Filed: Mar. 31, 2005

(65) Prior Publication Data

US 2006/0221431 A1    Oct. 5, 2006

(51) Int. Cl.
G02B 26/00 (2006.01)
G02B 26/08 (2006.01)
G02F 1/29 (2006.01)

(52) U.S. Cl. .................. 359/296; 359/298; 359/292

(58) Field of Classification Search ................ 359/296, 359/295, 290, 291, 292, 298
See application file for complete search history.

(56) References Cited

U.S. PATENT DOCUMENTS

| | | | |
|---|---|---|---|
| 5,917,646 A | 6/1999 | Sheridon | |
| 5,930,029 A | 7/1999 | Jacobson et al. | |
| 6,120,588 A | 9/2000 | Jacobson | |
| 6,392,786 B1 | 5/2002 | Albert | |
| 6,517,618 B2 | 2/2003 | Foucher et al. | |
| 6,525,866 B1 | 2/2003 | Lin et al. | |
| 6,529,313 B1 | 3/2003 | Lin et al. | |
| 6,538,801 B2 | 3/2003 | Jacobson et al. | |
| 6,549,327 B2 | 4/2003 | Foucher et al. | |
| 6,574,034 B1 | 6/2003 | Lin et al. | |
| 6,577,433 B1 | 6/2003 | Lin et al. | |
| 6,652,075 B2 | 11/2003 | Jacobson | |
| 6,677,926 B2 | 1/2004 | Biegelsen | |
| 6,693,621 B1 | 2/2004 | Hayakawa et al. | |
| 6,721,083 B2 | 4/2004 | Jacobson et al. | |
| 6,727,881 B1 | 4/2004 | Albert et al. | |
| 6,750,844 B2 | 6/2004 | Nakanishi | |
| 6,822,781 B1 | 11/2004 | Amici et al. | |
| 6,822,782 B2 * | 11/2004 | Honeyman et al. | 359/296 |
| 6,849,308 B1 * | 2/2005 | Speakman et al. | 427/595 |
| 6,970,285 B2 * | 11/2005 | Van Brocklin et al. | 359/296 |
| 7,008,522 B2 * | 3/2006 | Boucard et al. | 205/115 |
| 2002/0150827 A1 * | 10/2002 | Kawai et al. | 430/20 |
| 2002/0186450 A1 | 12/2002 | Foucher et al. | |
| 2003/0002132 A1 | 1/2003 | Foucher et al. | |
| 2006/0203327 A1 * | 9/2006 | Yasuda | 359/396 |
| 2006/0222976 A1 * | 10/2006 | Yang et al. | 430/32 |

* cited by examiner

Primary Examiner—Ricky Mack
Assistant Examiner—Brandi N Thomas
(74) Attorney, Agent, or Firm—Pepper Hamilton LLP

(57) ABSTRACT

Articles and methods for making capsules that include a cap of electrophoretic material suspended in a dielectric fluid are disclosed. The cap of electrophoretic material and dielectric fluid are encapsulated in a shell that forms the capsule. The cap may be moved to a viewable portion of an inner surface of the capsule shell, the cap proximate to the inner surface, when an electric field from of a pair of separated electrodes translates the cap of electrophoretic material in the capsule.

15 Claims, 7 Drawing Sheets

SIDE VIEW OF THE HEMISPHERE OF ANNEALED INK PARTICLES

ELECTROPHORETIC CAPS PREPARED FROM ENCAPSULATED ELECTROPHORETIC PARTICLES

BACKGROUND

Electrophoresis refers to the movement of charged particles suspended in a suspending fluid under the influence of an applied electric field. If the electric field is applied between electrodes in a cell, the particles will migrate, depending on their polarity, to either the cathode or the anode while the suspending fluid remains essentially stationary. When a voltage is applied to selected electrodes, the particles in the suspending fluid migrate under the influence of the electric field to the electrode having a polarity opposite from their own. Charging of electrodes can be used to create an image or pattern from the electrophoretic particles.

In some electrophoretic inks, the particles and suspending fluid can be contained within capsules or microcapsules. In these kinds of displays, the particles migrate through the suspending fluid within the capsule under the influence of an applied electric field. The capsules can be incorporated within a substance like a binder and applied to a wide variety of substrates, including flexible and non-planar substrates. In an encapsulated electrophoretic display, the binder material surrounds the capsules and may be used to separate the two electrodes defining the display. Examples of such inks are disclosed in U.S. Pat. No. 6,822,782 to Honeyman et al.; U.S. Pat. No. 6,693,621 to Hayakawa et al.; U.S. Pat. No. 6,750,844 to Nakanishi; and U.S. Pat. No. 6,529,313 to Lin et al., the disclosures of which are each totally incorporated herein by reference.

Encapsulated electrophoretic inks may be used in digital document media. Electrophoretic display devices may include a suspension of colored or otherwise visible charged pigment particles dispersed in a dyed insulating medium of contrasting color which is positioned in a cell consisting of two separated parallel and transparent conducting electrodes or plates. In some electrophoretic displays, the capsule has only a single type of visible electrophoretic particle suspended in a contrasting suspending medium. Capsules may be placed between a pair of separated parallel electrodes, at least one of which is transparent, to form a display. One example of an encapsulated electrophoretic ink includes capsules that contain white pigment electrophoretic particles suspended in a dyed or otherwise visible dielectric solvent or other fluid. During use in a display device, the white charged particles in the capsule are transported and packed against one electrode under the influence of an electric field, so that the viewer may see the white reflection from the pigment. When the polarity of the electric field is reversed, the pigment particles are transported away from the transparent electrode and may be packed on the opposite electrode. If the optical density of the dyed fluid is high enough to absorb the light scattered by the particles residing on or near the rear electrode, the observer will perceive the color of the dyed fluid.

During use in a display, packing of the ink or electrophoretic particles in the capsule leads to trapping of the dyed dielectric fluid in the interstices between the electrophoretic particles when they are attracted to the electrode. This dye trapping reduces the image or reflection produced by the pigmented electrophoretic particles. Further, the stability of the suspension of electrophoretic particles in the capsule impacts display quality and device speed. Agglomeration or settling of electrophoretic particles in capsules or display cavities can lead to degradation of the display over time.

There is a need for greater reflectivity in one particle electrophoretic displays to enhance the contrast and readability of images formed using them. There is a need to reduce dye trapping and the agglomeration of electrophoretic particles in displays utilizing single particle encapsulated electrophoretic particles.

SUMMARY

One embodiment of an article that can be used in a display device incorporating electrophoretic materials includes a cap of electrophoretic material suspended in a dielectric fluid and encapsulated in a shell. The cap of electrophoretic material in the capsule may be proximate to a viewable portion of an inner surface of the shell when the potential of an electrode near the shell attracts the cap of electrophoretic material to the viewable portion of an inner surface of the shell. The cap of electrophoretic material moves inside the shell in response to a change in the polarity of an external electric field surrounding or applied to the shell. In one embodiment the cap of electrophoretic material conforms to a portion of the inner shape of the shell.

Electrophoretic particles in a dielectric fluid in a capsule can include those made from a thermoplastic or wax polymer. These encapsulated thermoplastic electrophoretic particles may absorb heat supplied to them to fuse, anneal, or otherwise combine the electrophoretic particles in the capsule to form a cap of electrophoretic material within the capsule. In one embodiment, the electrophoretic material may be a glass transition temperature of about 140° C. or less. In another embodiment the electrophoretic material may have a glass transition temperature of about 75° C. or less. The cap of electrophoretic material formed inside the capsule may be nearly neutrally buoyant or neutrally buoyant in the dielectric fluid of the capsule.

A method of treating capsules that include electrophoretic particles of visible electrophoretic particles suspended in a dielectric fluid may include combining the visible electrophoretic particles together in the dielectric fluid of the capsule to form a cap of the electrophoretic material that covers a portion of an inner surface of the capsule. The method may involve the act of forming a cap from electrophoretic particles that may be combined by thermally annealing the electrophoretic particles together. In one version of the method, the electrophoretic particles in the capsule may be a material that includes a thermoplastic with a glass transition temperature of about 140° C. or less, the cap is formed by thermally annealing the electrophoretic particles together. The electrophoretic particles may include a pigment. The method forms an electrophoretic cap that may be neutrally buoyant or essentially neutrally buoyant in the dielectric fluid of the capsule. In versions of the method, the electrophoretic cap may be formed when the electrophoretic particles are oriented in the capsule in an electric field. The method of making the electrophoretic cap may include combining one or more electrophoretic particles in the capsule, and in an embodiment the size of the particles may be less than about 50 microns in size. In another embodiment the method of making the electrophoretic cap may include combining one or more electrophoretic particles in the capsule, the size of the particles may be less than about 5 microns in size.

The method may further include a first act of sandwiching between two electrodes the capsules that include visible electrophoretic particles suspended in a dielectric fluid and a substance capable of generating heat to fuse the electrophoretic materials inside each capsule together. One or more of the electrodes may be transparent to visible light or other electromagnetic energy. A source of energy may be used to initiate an exothermic polymerization reaction or other exothermic reaction that provides the heat to fuse the electrophoretic particles together in the capsule. The method of making the electrophoretic cap in the capsule may include combining one or more electrophoretic particles that may be less than about 50 microns in size. In another embodiment the method of making the electrophoretic cap in the capsule may include combining one or more electrophoretic particles that may be less than about 5 microns in size.

In another embodiment, an electrophoretic display that may include an airtight sealed cell or cavity formed from two opposed conductive substrates separated from each other by an insulator to form a cavity between the substrates. Each substrate may have one or more electrodes and at least one of the substrates and at least one of the electrodes are transparent. The sealed cavity includes one or more capsules between the substrates, each capsule includes a cap of an electrophoretic material suspended in a dielectric fluid in the capsule. The electrophoretic cap in the capsule may be free of voids or have fewer voids than the individual electrophoretic particles.

BRIEF DESCRIPTION OF THE DRAWINGS

FIG. 1 illustrates a capsule with one or more electrophoretic particles suspended in a dielectric fluid that are encapsulated in a shell.

In FIG. 2A, a negatively charged electrophoretic member is shown in cross section oriented toward a positively charged electrode.

DETAILED DESCRIPTION

Before the present compositions and methods are described, it is to be understood that they are not limited to the particular compositions, methodologies or protocols described, as these may vary. It is also to be understood that the terminology used in the description is for the purpose of describing the particular versions or embodiments only, and is not intended to limit their scope which will be limited only by the appended claims.

It must also be noted that as used herein and in the appended claims, the singular forms "a", "an", and "the" include plural reference unless the context clearly dictates otherwise. Thus, for example, reference to an "electrophoretic particle" is a reference to one or more electrophoretic particles and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein may be used in the practice or testing of embodiments disclosed, the preferred methods, devices, and materials are now described. All publications mentioned herein are incorporated by reference. Nothing herein is to be construed as an admission that the present disclosure is not entitled to antedate these references.

"Optional" or "optionally" means that the subsequently described event or circumstance may or may not occur, and that the description includes instances where the event occurs and instances where it does not.

As used herein, a "one particle" or "single particle" ink, capsule or display refers to ink, a capsule or a display in which encapsulated ink particles are of a substantially uniform color or combinations of colors. Although the embodiments described herein discuss a one particle embodiment, other embodiments, such as two, three, or more color particles, are possible. Although the embodiments described herein refer to the color as white, any color may be used. Although the embodiments described herein refer to the particle charge as negative, positive particles are possible.

Figure 1A:
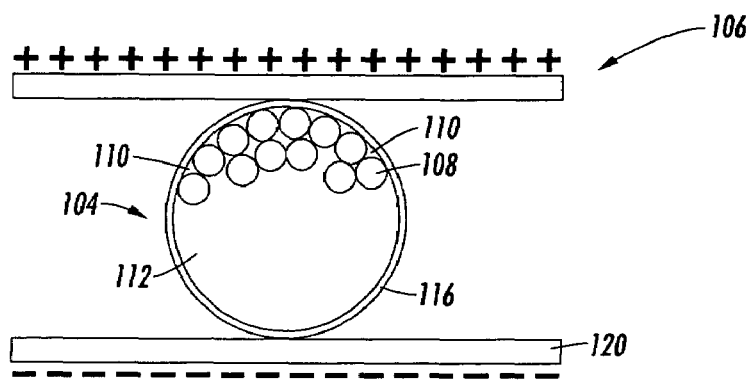
In FIG. 1A, the capsule is shown in cross section between one or more electrodes, at least one of which is transparent.
Figure 1B:
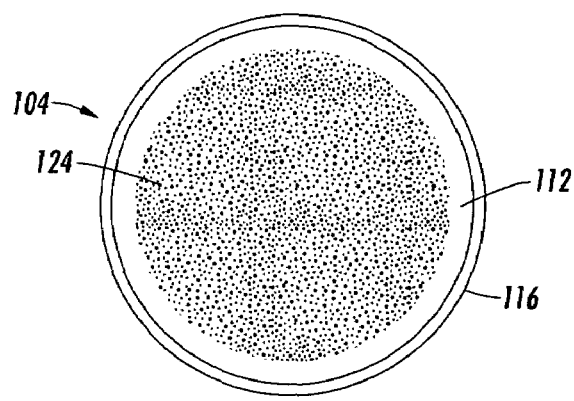
FIG. 1B illustrates a top view.
Figure 1C:
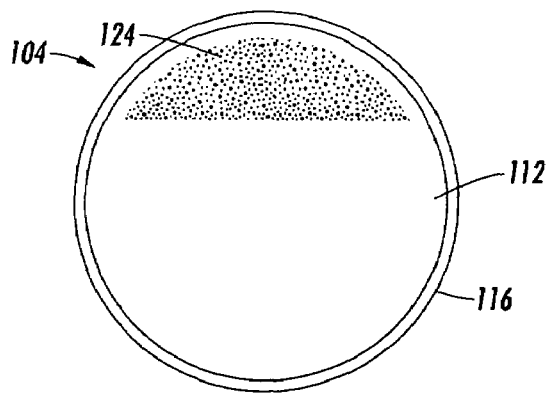
FIG. 1C is a side view, of the capsule.

FIG. 1A illustrates a capsule 104 that may include electrophoretic particles 108 enclosed with a dielectric fluid 112 inside a shell 116. Although FIG. 1A and the other figures illustrate the capsule as having a spherical shape, other shapes, such as cylinders, egg-shaped shells, hemispheres, and other shapes are possible. The capsule 104 is shown positioned between a charged transparent electrode 106 that attracts negatively charged electrophoretic particles 108 to the electrode, a second electrode 120 may be oppositely charged. In an embodiment, interstices 110 between the particles are illustrated as being filled with the dielectric fluid 112. The dielectric fluid 112 in the interstices 110 may reduce the reflectance of light from the electrophoretic pigment particles 108 in the capsule 104. A top view FIG. 1B of the capsule 104, for example through electrode 106 having the correct polarity, illustrates the suspension of particles 124 attracted to the inner surface of the shell 116. The packing of the particles allows dielectric fluid to partially or completely fill the voids and interstices between the particles 108 in the shell 116. A side view, FIG. 1C, shows a side view of a capsule with a particle suspension 124 attracted to the inner surface of the shell 116 (electrodes not shown).

Figure 2A:
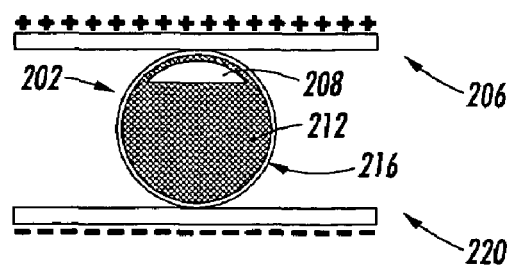
FIG. 2A illustrates a fused mass of electrophoretic particles that form a cap or member in dielectric fluid that is encapsulated by a shell.
Figure 2B:
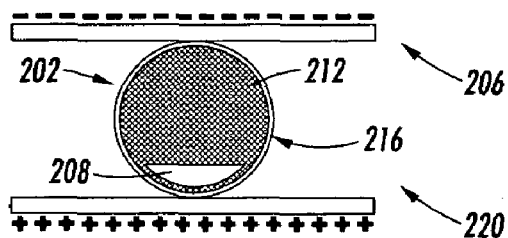
FIG. 2B illustrates attraction when the charges are reversed.
Figure 2C:
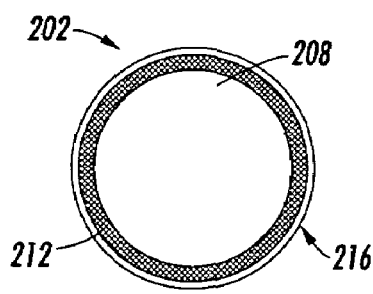
FIG. 2C illustrates a top view.

Microcapsules or other capsules 104 containing one particle electrophoretic ink 108, such as the example shown in FIG. 1, may be sandwiched between one or more transparent electrodes, for example 106 and 120, and an electric field may be applied to the particles 108 to aggregate them in one portion of the microcapsule. Referring briefly to FIG. 2, which will be described in more detail below, the aggregated electrophoretic ink particles may be linked together, fused together, or combined together in other ways to form a moveable cast slab or a moveable cast cap 208 inside the capsule 104 from two or more of the electrophoretic ink particles as illustrated in FIG. 2A. The cast slab 208 reduces the number of interstices between the ink particles and may improve their contrast when used in displays. In one embodiment, aggregation of particles may occur by heating microcapsules 202 above the glass transition temperature of the thermoplastic of the electrophoretic particles, which causes the electrophoretic particles to fused together to create a continuous surface. This slab or cap of annealed electrophoretic ink may undergo rotation under the effect of a changed applied electric field from electrodes 220 and 206 as illustrated FIG. 2A and FIG. 2B. In an embodiment, the relatively smooth surface of the annealed ink does not trap dye or dielectric fluid 212 in any substantial amount, resulting in enhanced reflectivity.

FIG. 2 illustrates an embodiment wherein electrophoretic particles have been aggregated. FIG. 2A illustrates a cross section of a capsule 202 that may include a visible cap 208 of electrophoretic particles that have combined or fused together. The cap 208 is enclosed within a dielectric fluid 212 inside a shell 216 of the capsule 202. The capsule 202 in FIG. 2A is shown positioned between a charged transparent electrode 206 that attracts the charged electrophoretic cap 208 to the electrode 206. An electrode that has the opposite polarity 220 is positioned opposite electrode 206 to form a cavity for the capsule. As shown in FIG. 2B, the charge on the electrodes 206 and 220 may be reversed, which results in movement of the cap 208 to the bottom positively charged electrode 220. FIG. 2C shows a top view of the capsule 202, with the cap 208 positioned in the shell 216. In an embodiment, a portion of dielectric fluid 212 may be visible along the outside of the cap 208. Depending upon the amount of particles that combine together to form the cap 208, the size of the cap 208 can vary from an area completely covering the dielectric fluid to a coverage area of the dielectric fluid greater than may be achieved with separated particles. FIG. 2D illustrates a side view of a capsule with a cap 208 attracted to the inner surface 224 of the shell 216 (electrodes not shown). Although not required, movement of the cap may be improved if a surface 230 of the cap 208 has a shape that conforms to the inner surface 224 of the shell 216 but does not contact the shell 216. The cap 208 is illustrated in FIG. 2D with a shaped underside 228. Other shapes of undersides, such as shells and hemispheres, are illustrated in FIGS. 2E and 2F, respectively. The shape may be derived from a relatively low solids loading (FIG. 2E) or relatively high solids loading (FIG. 2F) of particles.

Figure 3A:
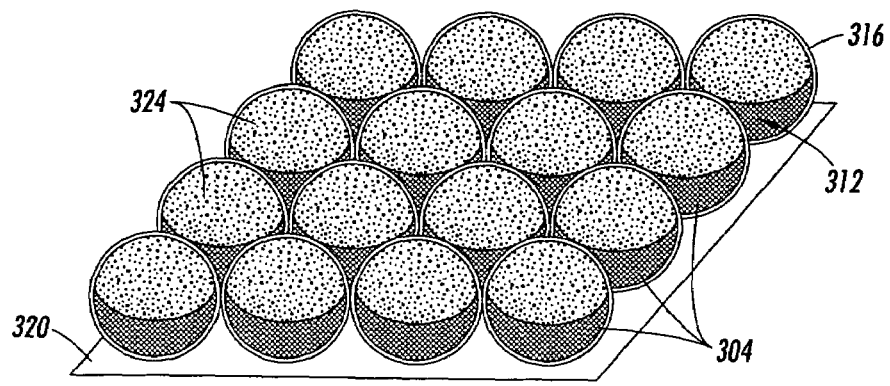
FIG. 3 illustrates an exemplary method for preparing annealed electrophoretic caps or members encapsulated in a shell.
Figure 3B:
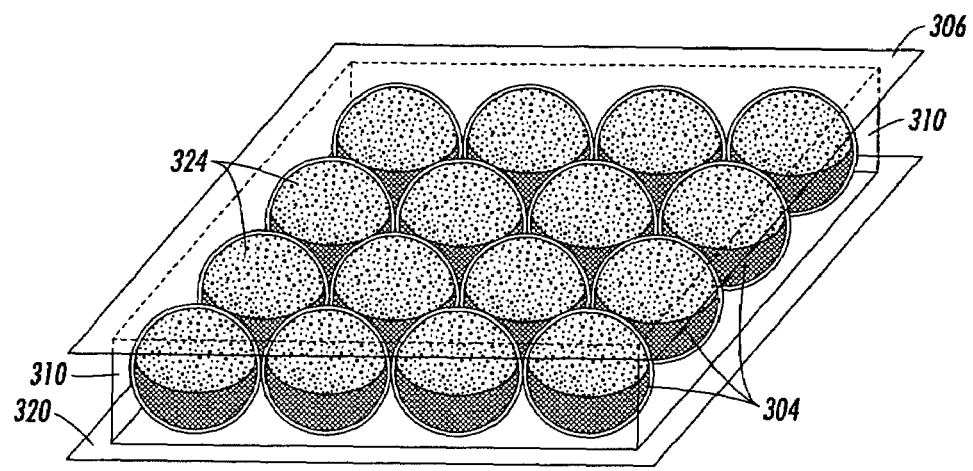

FIG. 3 illustrates an embodiment of a process for making electrophoretic caps from electrophoretic particles dispersed in a dielectric fluid 324 in capsules 304. A method of treating capsules 304 that include visible electrophoretic particles suspended in a dielectric fluid 324 may include combining, fusing, annealing or otherwise joining two or more of the individual visible electrophoretic particles in the dielectric fluid positioned in proximity to an inner surface of the shell 316 together to form an electrophoretic cap 308 that has a shape that corresponds to a portion of an inner surface of the capsule. The capsules 304 may be coated with a reactive monomer and initiator mixture 310 that react together to release heat during a curing step. Combining the individual visible electrophoretic particles in the dielectric fluid 324 of the capsule together may be accomplished by heat generated from the initiator substance or a reactive composition 310, such as an ultraviolet (UV) in contact with the capsules 304. The substance or reactive composition 310 may coat a portion or all of the capsules 304. In one embodiment the capsules 304 and reactive substance 310 are sandwiched between two transparent conductive plates 306 and 320. For example as illustrated in FIG. 3A, the process can include coating capsules 304 on an electrode 320 that may include indium tin oxide and/or another conductive transparent material. The capsules 304 each have dielectric fluid 312, shell 316, and electrophoretic particles suspended in a dielectric fluid 324 that is shown for illustrative purposes only as being in contact with the upper inner surface of the capsules. The capsule 304 may have a surface coating or be surrounded by a substance 310 that releases sufficient heat upon absorption of water vapor or other gas to fuse together the electrophoretic particle in the capsule 304.

The capsules 304 and mixture 310 may be sandwiched between two electrodes 306 and 320 and the mixture 310 reacted by exposure to a source of activating energy like a UV light source, microwaves, or other energy source. The thermal energy emitted by a high powered UV light source may also be absorbed by the capsules 304, thereby causing the individual encapsulated electrophoretic particles to melt, fuse together, and form an electrophoretic cap 308. The monomer can polymerize to form a matrix 336 with the heat released during the reaction fusing individual electrophoretic particles in the capsules to form an electrophoretic cap 308 with a shape that conforms to a portion of the inner surface of the capsule shell 316 and has a bottom surface 328. The cap 308 may move within the capsule shell 316 in response to a change in an electric field between the electrodes 306 and 320. Capsules 302 have the electrophoretic cap 308 suspended in the dielectric fluid 312. The cap of electrophoretic material formed inside the capsule may be neutrally buoyant or neutrally buoyant in the dielectric fluid of the capsule.

Figure 3C:
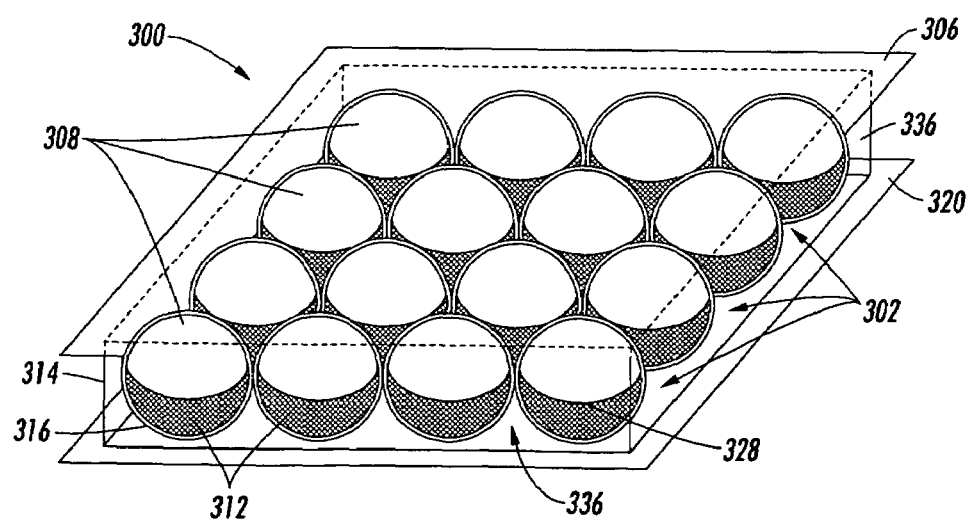

The cap 308 of electrophoretic material and dielectric fluid 312 are encapsulated in a shell 316 to form the capsule 302. As illustrated in FIG. 3C, the cap 308 of electrophoretic material in an applied electric field between electrodes 306 and 320 may be proximate to a viewable portion of an inner surface of the capsule shell 316 when the potential of an electrode near the shell attracts the cap of electrophoretic material to the viewable portion of an inner surface of the shell 316.

The electrophoretic particles may have a size and be made from a material with a glass transition temperature that facilitates their fusion or combination to form a molded mass from the electrophoretic particles inside a portion of the capsule. The molded mass of electrophoretic material that takes the shape of an inside surface of the capsule has fewer interstices to trap dye than the individual electrophoretic particles. The molded mass of electrophoretic material may move within the capsule response to an electric field. In embodiments of the method, fine electrophoretic particles are used. In one embodiment, the capsules may have a size ranging from about 100 microns to about 300 microns, and the electrophoretic particles may have a size in the range of from about 1 micron to about 50 microns. In another embodiment, the capsules may have a size ranging from about 125 microns to about 150 microns, and the electrophoretic particles may have a size in the range of from about 1 micron to about 5 microns. Other sizes are possible.

The thermoplastic or wax of the electrophoretic particles may be chosen to have a glass transition temperature to facilitate the fusion or combination of the particles at the temperatures generated by the exothermic reaction. The thermoplastic may also chosen so that the electrophoretic device may be used at high temperatures. In one embodiment, the electrophoretic material may have a glass transition temperature of about 140° C. or less. In another embodiment, the electrophoretic material may have a glass transition temperature of about 75° C. or less. In embodiments, other waxes or thermoplastics may be used, particularly those that have a low $T_g$ and a low melt flow index (low $T_g$ being about 40° C. to about 100° C., or more particularly about 50° C. to about 70° C. Examples of thermoplastics may include but are not limited to Nucrel® resins from DuPont, which are processable ethylene copolymers with varying methacrylic acid contents and hence different melt indices. Other thermoplastics may include ethylene-vinyl acetate (EVA) copolymers. These thermoplastics or waxes may be pigmented. Other examples of polymer materials that may be used to make the electrophoretic ink particles include polystyrene and PMMA (poly(methylmethacrylate)).

The microcapsules containing the one-particle electrophoretic ink may be dispersed in a variety of binders that can undergo polymerization to generate heat that serves to fuse or anneal the electrophoretic ink particles to create the cap or shell within each capsule. Examples of binders include but are not limited to Sartomer resin CN963A80, (an aliphatic polyester based urethane diacrylate oligomer (80%) in tripropylene glycol diacrylate) diluted further with more tripropylene glycol diacrylate (SR306) to achieve the desired viscosity In an embodiment, the viscosity may range from about 5 centipoise to about 1000 centipoise, or more particularly from about 20 centipoise to about 200 centipoise.

One method for annealing or combining the electrophoretic particles may be the heat generated by a polymerization reaction. One example of a photoinitiator that may be used is 2,4,6-trimethylbenzoyldiphenylphosphine oxide (Lucrin TPO). Other photoinitiators may be used, such as such as benzophenones, benzoin ethers, benzilketals, α-hydroxyalkylphenones, α-aminoalkylphenones and acylphosphine photoinitiators sold under the trade designations of Irgacure and Darocur from Ciba. Specific examples include 2,4,6-trimethylbenzoyldiphenylphosphine oxide (available as BASF Lucirin TPO); 2,4,6-trimethylbenzoylethoxyphenylphosphine oxide (available as BASF Lucirin TPO-L); bis(2,4,6-trimethylbenzoyl)-phenyl-phosphine oxide (available as Ciba Irgacure 819) and other acyl phosphines; 2-methyl-1-(4-methylthio)phenyl-2-(4-morphorlinyl)-1-propanone (available as Ciba Irgacure 907) and 1-(4-(2-hydroxyethoxy)phenyl)-2-hydroxy-2-methylpropan-1-one (available as Ciba Irgacure 2959); 2-benzyl 2-dimethylamino 1-(4-morpholinophenyl)butanone-1 (available as Ciba Irgacure 369); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethylbenzoylphenylphosphinic acid ethyl ester; oligo(2-hydroxy-2-methy-1-(4-(1-methylvinyl)phenyl)propanone); 2-hydroxy-2-methyl-1-phenyl-1-propanone; benzyl-dimethylketal; and mixtures thereof. Mention may also be made of amine synergists, for example such as ethyl-4-dimethylaminobenzoate and 2-ethylhexyl-4-dimethylaminobenzoate. This list is not exhaustive, and any known photoinitiator that initiates the free radical reaction upon exposure to a desired wavelength of radiation such as UV light can be used without limitation. The total amount of initiator included in the ink may be from, for example, about 0.5 to about 15%, more particularly from about 1 to about 10%, by weight of the coating.

To prepare capsules containing an inner electrophoretic cap, a mass of capsules with suspended electrophoretic particles and a mass of substance for a display or display element may be used. Two or more electrophoretic particles in the capsule may be fused or combined together to form the cap or member inside the capsule. Where the two or more electrophoretic particles are thermally combined by melting or fusion of the particles, heat can be supplied to the capsules to result in the fusion. Heat may be supplied by dielectric heating, by the reaction of a substance surrounding the capsules, by placing the capsules in a reactive substance capable of generating enough heat to fuse the electrophoretic particles in the capsule, or by other methods. Based on the heat capacity and amount of the materials used to prepare a display or element, a ratio of capsules to the reactive or heat generating substance can be determined. In one embodiment a weight ratio of 50% solid, capsules with electrophoretic particles, to a substance like a monomer resin and initiator may be used. The glass transition temperature of the thermoplastic that makes up the electrophoretic particles may require ratios other than 50% which may be determined experimentally without undue experimentation. In some embodiments the concentration of the electrophoretic particles of the dielectric medium in the capsule can range of from about 5 to about 80 percent by weight depending upon the density of the particles. In other embodiments, the weight ratio of particles to medium is about 1 to about 30%, more particularly about 2 to about 10%. Heating temperatures above about 60° C., and melt times from about 5 second to about 10 seconds, may be used, although other temperatures and melt times are possible.

To form a display with moveable cast electrophoretic caps positioned within a capsule, the electrophoretic particles in the capsule are oriented to take the shape of an inner surface of the capsules. The inner capsule surface acts like a mold or template for the electrophoretic particles. The particles may be allowed to settle to a surface in a capsule, they may be magnetically positioned on a surface of the capsule, or they may be positioned by placing the capsules in an electric field. Once the electrophoretic particles have been oriented in the capsule, they may be treated to combine or fuse two or more of the electrophoretic particles together to form a cast mass or a cast cap of electrophoretic material inside the capsules.

The cap formed by combining electrophoretic particles in a capsule together may be neutrally buoyant, or near neutrally buoyant, and may move from one part of the capsule to another in a changing electric field applied to the capsule.

The capsule may be a cylinder, a sphere, a spheroid, an ellipsoid (oblate or prolate), a shell, a hemisphere, or other shape in which an electrophoretic mass could move or rotate in response to a change in an applied electric field. In referring to a single type of capsule, it is to be understood that they may have different shapes and that they are not required to be identical. For example, provided that all capsules of the type possess substantially the same optical characteristic and a charge of the same polarity, considerable variation in parameters such as capsule size and electrophoretic mobility of caps inside the capsule can be tolerated without affecting the utility of an electrophoretic device made using them.

Figure 2D:
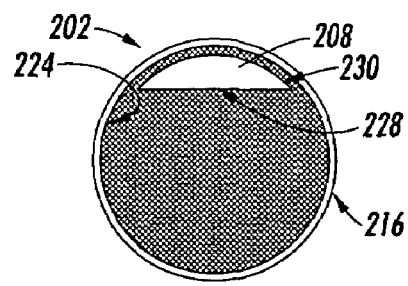
FIG. 2D illustrates a side view.
Figure 2E:
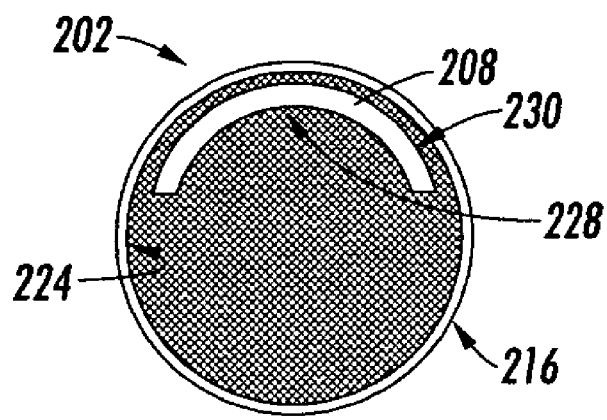
FIGS. 2E and 2F illustrate alternate embodiments wherein the caps have different shapes.
Figure 2F:
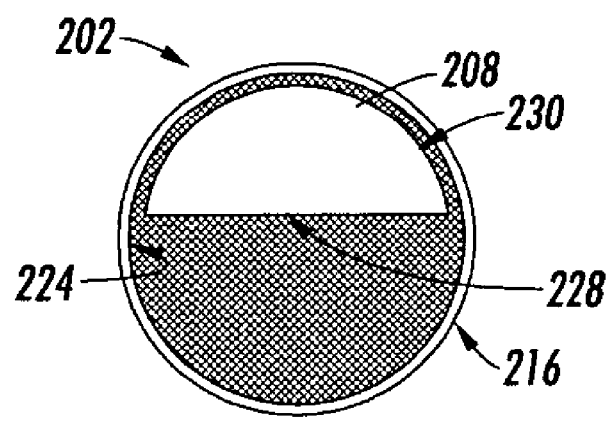
Figure 4:
FIG. 4 presents images of exemplary annealed electrophoretic members encapsulated in a shell in an electrophoretic display device.
Figure 4:
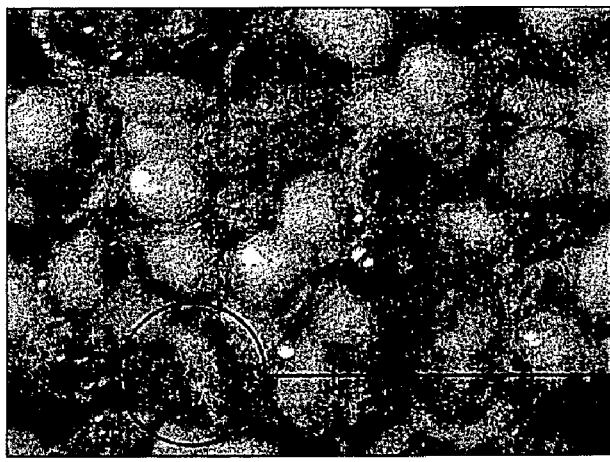
Figure 4:
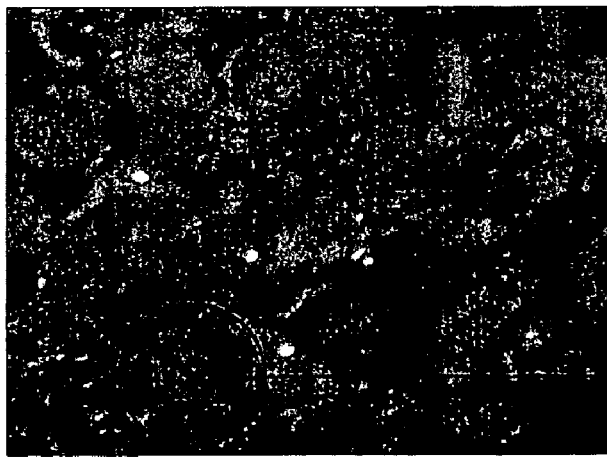

The viewable portion of the electrophoretic mass formed in the capsule by the fusion or combination of the electrophoretic particles conforms to the inner surface of the capsule. The electrophoretic mass formed in the capsule by the fusion or combination of the electrophoretic particles may have a viewable portion approximated by the form of an inner cap which without limitation may have a flat, convex, concave, or other shape for the base. The cap for a sphere is that portion of the sphere cut off by a plane; the cap for an oblate ellipsoid is that portion or volume of the ellipsoid cut off by a plane parallel to the major axis; the cap for a cylinder may be that volume cut off by a plane parallel to the rotational axis. In general for any shaped capsule, a cap of the electrophoretic material is a portion or volume of fused electrophoretic particles that conform to an inner surface of the capsule. The viewable portion of the electrophoretic mass will generally conform to the inner surface or a portion of the capsule. The cap or electrophoretic mass may have an inner surface facing the center of the capsule that may be but is not limited to a shape that is planar, convex, concave, or other surface topology. The side view of FIG. 2D illustrates a non-limiting example of an electrophoretic mass 208 formed by fusion or combination of one or more electrophoretic particles. In FIG. 2D the electrophoretic mass has a viewable portion that conforms to a portion of the inner surface of the capsule and is illustrated as having essentially concave surface in contact with the inside of the shell. In FIG. 2d the side 228 of the electrophoretic mass facing the center of the capsule is illustrated as being slightly convex. As another example, FIG. 4 illustrates images of annealed electrophoretic discs or members encapsulated in a shell in an electrophoretic display device.

An electrophoretic device may be formed using one or more capsules that include a cap of electrophoretic material inside the shell of the capsule. A pair of electrodes may be spaced apart to form a cavity with one or more of the capsules positioned between the electrodes. In one embodiment, at least one of the electrodes is transparent to visible light and the cavity contains one or more capsules containing an electrophoretic cap. The cavity formed by the electrodes may also contain a dielectric material or substance between the capsules. A voltage applied to one or more electrodes can be used to move the electrophoretic caps in the capsules and form an image at the transparent electrode.

Referring to FIG. 3C, an electrophoretic cell may include a first electrode 306 and a second electrode 320. One or more of the electrodes may be transparent, side walls 314 or spacers may be used to separate the electrodes or plates and may be used to complete a cavity between the electrodes. The side walls 314 or other similar structure form a cavity in which the capsules 302 may be set. FIG. 3C illustrates a number of capsules 302 between the two electrodes. These capsules may define a single pixel. In some embodiments of devices that include capsules enclosing an electrophoretic cap, a larger or smaller number of capsules between each electrode may be used to define a pixel.

Figure 5:
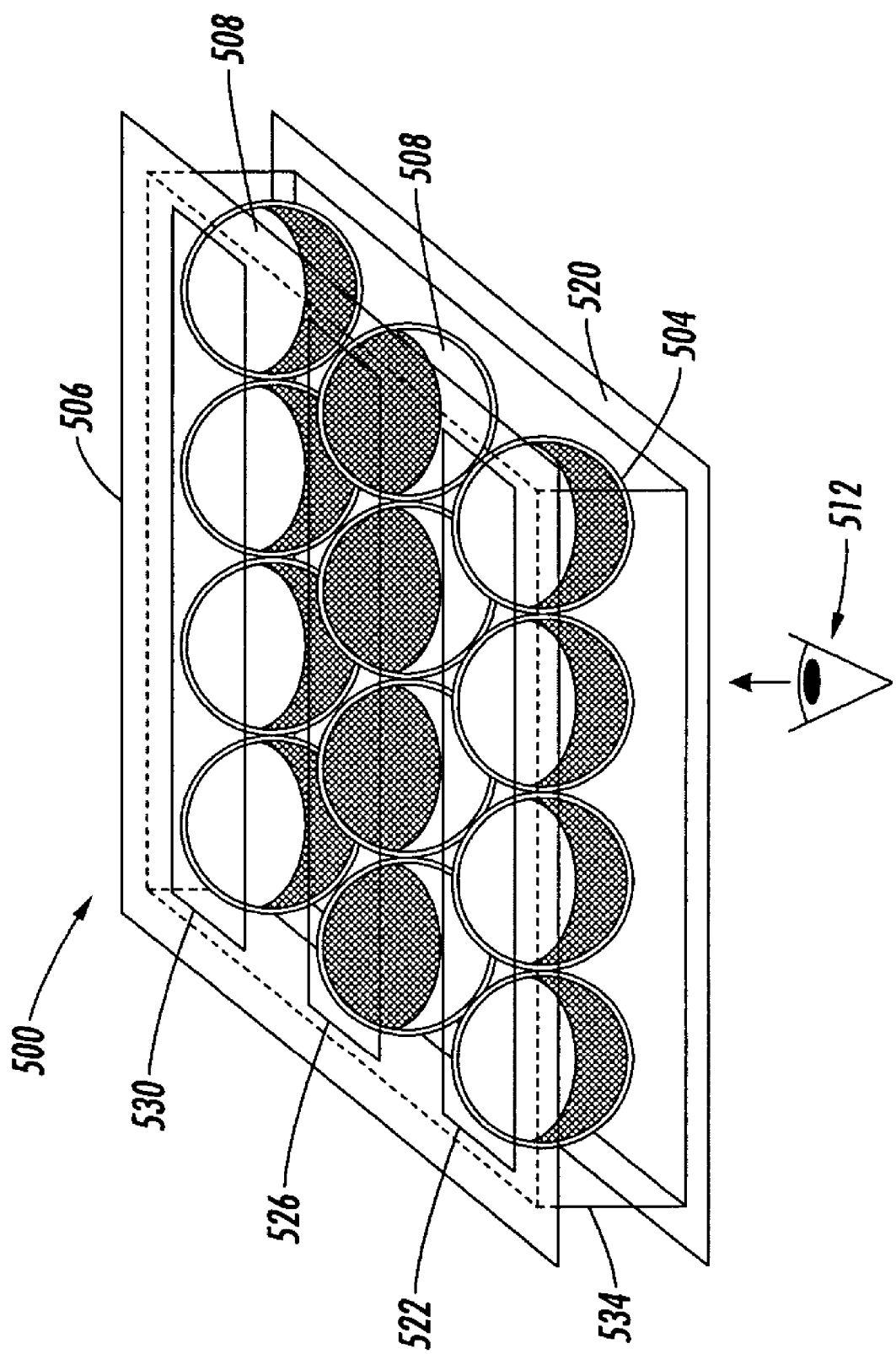
FIGS. 5 and 6 illustrate aspects of an exemplary electrophoretic display that can include a light-transmissive front electrode, a rear electrode spaced from the front substrate to form a fluidly sealed cavity, and one or more electrophoretic capsules in a medium.
Figure 6:
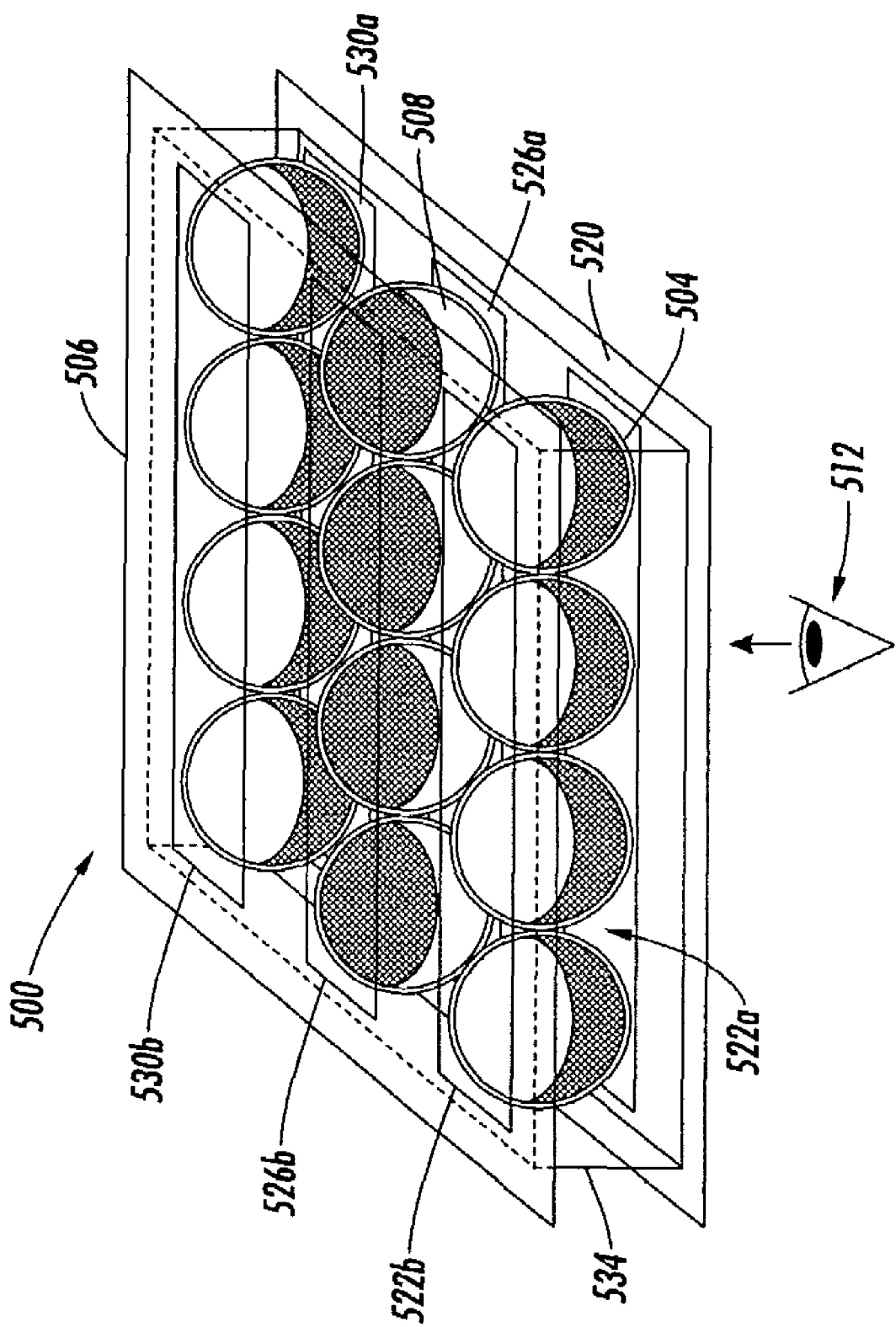

FIG. 5 illustrates an electrophoretic cell 500 that may be used, for example, in a display, with electrodes 522, 526 and 530 formed on a substrate 506, FIG. 6 illustrates an alternate electrophoretic cell with transparent electrodes 522a, 526a, and 530a formed on the inside of substrate 520 and electrodes 522b, 526b, and 530b formed on the inside of substrate 506. Each of the transparent electrodes 522a, 526a, and 530a are illustrated with four corresponding capsules, however other numbers of capsules per electrode are possible. Each of the capsules may have a capsule wall, a dielectric fluid held within the capsule wall and at least one electrically charged cap or disc of fused electrophoretic material suspended in the dielectric fluid of the capsule so as to be capable of moving in the capsule on application of an electric field by the electrodes of the display.

In operation, the device of the FIG. 6 is provided with an electrical potential from a source (not shown) between transparent front electrodes 522a, 526a, and 530a that may be deposited on substrate 520 and rear electrodes 522b, 526b, and 530b deposited on substrate 506. An electrical field across the cavity between the pairs of electrodes may be used to electrophoretically move the cap 508 in each capsule 504. Where the caps are formed from negatively charged electrophoretic particles, the caps will move toward a positively charged electrode and will move away from a negatively charged electrode. The electrodes 522a, 526a, and 530a and 522b, 526b, and 530b are addressable and may be used to create a pattern of the caps across the cavity. For example as shown in FIG. 6, negatively charged electrophoretic caps 508 may be attracted to positively charged electrodes 522b and 530b, and negatively charged caps 508 may be moved toward positively charged electrode 526a. When viewed from the bottom 512 through transparent substrate 520 as shown, a row of white caps will be visible in the center of the substrate 520. The caps 508 attracted to the positively charge electrode will appear dark due to the dielectric fluid in the capsules. In an embodiment, such as an electrophoretic display device, the encapsulated caps may include a plurality of cavities.

The electrophoretic display electrodes may be made of a conductive electrode material such as but not limited to ITO, or they may be another material, such as a glass substrate with a coating of a transparent conductive material like ITO deposited on the inward surface of the substrates.

Any other configuration of electrophoretic display can be employed with the electrophoretic particles described herein, including (but not limited to) those illustrated in U.S. Pat. Nos. 3,612,758, 5,930,026, 5,961,804, 6,017,584, 6,067,185, 6,118,426, 6,120,588, 6,120,839, 6,124,851, 6,130,773, 6,130,774, 6,172,798, and 6,177,921, the disclosures of each of which are totally incorporated herein by reference.

Examples of suitable suspending fluids include aliphatic hydrocarbons, such as pentane, hexane, cyclohexane, decane, dodecane, tetradecane, pentadecane, hexadecane, paraffinic hydrocarbons such as the isoparaffinic ISOPAR® G, ISOPAR® H, ISOPAR® K, ISOPAR® L, ISOPAR® M, and ISOPAR® V, and the normal paraffinic NORPAR® 12, NORPAR® 13, NORPAR® 15, and NORPAR® 16, all available from Exxon Corporation, and the like, aromatic hydrocarbons, such as toluene, naphthalene, xylene, and the like, other hydrocarbons such as kerosene, naphtha, and gasoline, halogenated hydrocarbons, such as tetrachloroethylene, carbon tetrachloride, tetrafluorodibromoethylene, trifluorochloroethylene, 1,2,4-trichlorobenzene, and the like, halogen-containing polymers such as poly(chlorotrifluoroethylene), siloxanes, such as dimethyl polysiloxane, octamethyl cyclosiloxane and higher molecular weight cyclic siloxanes, poly(methyl phenyl siloxane), hexamethyldisiloxane, and the like, materials disclosed as suitable curable liquid vehicles in U.S. Pat. Nos. 5,364,726 and 5,334,699, the disclosures of each of which are totally incorporated herein by reference, and the like, as well as mixtures thereof.

If desired, the suspending fluid can optionally contain an optically absorbing dye. Any desired or suitable dye can be employed. Specific examples of suitable dyes include the Oil Red dyes, the Sudan Red and Sudan Black series of dyes, the Oil Blue dyes, the Macrolex Blue series of dyes, Michier's hydrol, Malachite Green, Crystal Violet, Auramine O, ORASOL BLUE 2GLN, ORASOL RED G, ORASOL YELLOW 2GLN, ORASOL BLUE GN, ORASOL BLUE BLN, ORASOL BLACK CN, and ORASOL BROWN CR, all available from Ciba, MORFAST BLUE 100, MORFAST RED 101, MORFAST RED 104, MORFAST YELLOW 102, MORFAST BLACK 101, and MORFAST BLACK 108, all available from Morton Chemical Company, BISMARK BROWN R, available from Aldrich, NEOLAN BLUE, available from Ciba, SAVINYL YELLOW RLS, SAVINYL BLACK RLS, SAVINYL RED 3GLS, and SAVINYL PINK GBLS, all available from Sandoz, and the like, as well as mixtures thereof. When present, the optional dye is present in the suspending fluid in any desired or effective amount, such as at least about 0.01 percent by weight of the suspending fluid, optionally at least about 0.05 percent by weight of the suspending fluid, and typically no more than about 1 percent by weight of the suspending fluid. In an embodiment, the dye is present in an amount that is no more than about 0.5 percent by weight of the suspending fluid, although the amount of dye can be outside of these ranges.

If desired, an optional charge control agent or additive can be added to the particle suspension to increase particle charge in suspension or make more of the particles charge to one polarity. Examples of suitable charge control agents include (but are not limited to) linseed oil; alkyd resins; polyamide resins such as VERSAMID®; polyethylene; shellac; organic sulfates and sulfonates, including (but not limited to) bis(2-ethyl hexyl) sodium sulfosuccinate, sodium dihexyl sulfosuccinate, sodium dioctyl sulfosuccinate, calcium dodecyl benzene sulfonate, calcium petroleum sulfonate, neutral or basic barium dinonylnaphthalene sulfonate, neutral or basic calcium dinonylnaphthalene sulfonate, dodecylbenzenesulfonic acid sodium salt, ammonium lauryl sulfate, and the like; basic or neutral barium petronate; calcium petronate; the cobalt, calcium, copper, manganese, nickel, zinc, and iron salts of naphthenic acid; the barium, aluminum, zinc, copper, lead, chromium, calcium, and iron salts of stearic acid; the lithium, cadmium, calcium, manganese, magnesium, and zinc salts of heptanoic acid; the barium, aluminum, cobalt, manganese, zinc, cerium, and zirconium salts of 2-ethyl hexanoic acid (these are known as metal octoates); aluminum diisopropyl salicylate; aluminum t-butyl salicylate; aluminum resinate; aluminum salts of 3,5 di-t-butyl gamma resorcylic acid; block and comb copolymers, including (but not limited to) AB diblock copolymers of (A) polymers of 2-(N,N)-dimethylaminoethyl methacrylate quaternized with methyl-p-toluenesulfonate and (B) poly-2-ethylhexyl methacrylate, comb graft copolymers with oil soluble tails of poly (12-hydroxystearic acid) and having a molecular weight of about 1800 pendant on an oil-soluble anchor group of poly (methyl methacrylate-methacrylic acid), and the like; organic amides, including (but not limited to) polyisobutylene succinimides such as OLOA 1200, N-vinyl pyrrolidone polymers, and the like; organic zwitterions, including (but not limited to) lecithin and the like, organic phosphates and phosphonates, including (but not limited to) the sodium salts of phosphated mono- and di-glycerides with saturated and unsaturated acid substituents, and the like; and the like, as well as mixtures thereof. Charge adjuvants such as stearates, metallic soap additives, polybutylene succinimides, and the like are also described in references such as U.S. Pat. Nos. 4,707,429, 4,702,984, and 4,702,985, the disclosures of each of which are totally incorporated herein by reference. When present, the optional charge control agent is present in the electrophoretic ink in any desired or effective amount, such as at least about 0.001 percent by weight of the electrophoretic ink, and optionally at least about 0.01 percent by weight of the electrophoretic ink, also optionally no more than about 3 percent by weight of the electrophoretic ink, and in a particular embodiment no more than about 0.8 percent by weight of the electrophoretic ink, although the amount can be outside of these ranges.

Microcapsules containing the suspending fluid and the photochromic particles can be made by any desired or suitable process. For example, methods for preparing microcapsules are disclosed in, for example, U.S. Pat. Nos. 4,087,376, 4,001,140, 4,273,672, 5,961,804, 2,800,457, 5,604,027, "Polymer-Encapsulated Particles with Controlled Morphologies: Preparation, Characterization and Application", Wei-Hsin Hou, Ph.D. Thesis, Lehigh University, 1991, UMI Disseration Service, University Microfilms International, Ann Arbor, Mich., and Microcapsule Processing and Technology, Asaji Kondo, Marcel Dekker, Inc. (1979), the disclosures of each of which are totally incorporated herein by reference.

A photochromic material such as spiropyran or a spiropyran-containing mateiral, may be present in the particles, and the particles may be contained in the electrophoretic ink, in any amount effective to impart to the electrophoretic ink the desired color and intensity under the appropriate light conditions. The photochromic material may be present in the particles such as in an amount of at least about 1 percent by weight of the particles, and optionally at least about 5 to about 10 percent by weight of the particles, and optionally in an amount of no more than about 20 percent by weight of the particles, and in an embodiment no more than about 10 percent by weight of the particles, although the amount can be outside of these ranges. Typically, the particles are present in the electrophoretic ink in an amount of at least about 1 percent by weight of the electrophoretic ink, and optionally at least about 5 to about 10 percent by weight of the electrophoretic ink, and optionally in an amount of no more than about 20 percent by weight of the electrophoretic ink, and in an embodiment no more than about 10 percent by weight of the electrophoretic ink, although the amount can be outside of these ranges. The particles may include a pigment such as ferroelectric ceramics, such as lead zirconate titanate, magnetites, ferrites, iron oxide, manganese ferrites, DUPONT® R900 titanium dioxide, carbon black, such as CABOT® MOGUL® L and CABOT® MONARCH® 1000, FERRO® 6331 black pigment, BAKER® CHEMICAL Cresyl violet blue, BAKER® CHEMICAL Rhodamine 6G, DUPONT® Rhodamine BI, DUPONT® Spirit Blue NS, DUPONT® Victoria Blue B base, ALLIED® CHEMICALS Iosol Blue, EASTMAN® Acridine orange, CALCO® OIL blue N, CALCO® OIL black, other pigments or dyes, or the like.

When particles of two or more different colors are used in the electrophoretic ink, examples of suitable particle materials for those particles other than the ones containing the photochromic material according to the present invention include (but are not limited to) laked pigments, scattering pigments, absorbing pigments, luminescent particles, reflective particles, retroreflective particles, transparent particles, and the like. Specific examples of suitable particle materials for those particles other than the ones containing the photochromic material according to the present invention include (but are not limited to) barium sulfate, cadmium red, cadmium sulfo-selenide, calcium silicates, chromium oxide, iron oxides, lead chromate, manganese dioxide, selenium (arsenic doped), silicon monoxide, sulfur, vermilion red, zinc oxide, zinc sulfide, zirconium oxide, lead chromate, kaolin, titania (including rutile and anatase, both of which can be coated in one or two layers with a metal oxide, such as aluminum oxide, silicon oxide, or the like), metal particles, carbon black, anthracenes, phthalocyanines, diarylide yellow, hansa yellow, benzidin yellow, commercially available pigments such as Cyan Blue GT 55-3295 (American Cyanamid), Cibacron Black BG (Ciba), Cibacron Turquoise Blue G (Ciba), Cibalon Black BGL (Ciba), Orasol Black BRG (Ciba), Orasol Black RBL (Ciba), Acetamine Blac, CBS (DuPont), Crocein Scarlet N Ex (DuPont), Fiber Black VF (DuPont), Luxol Fast Black L (DuPont), Nirosine Base No. 424 (DuPont), Oil Black BG (DuPont), Rotalin Black RM (DuPont), Sevron Brilliant Red 3 B (DuPont), Basic Black DSC (Dye Specialties, Inc.), Hectolene Black (Dye Specialties, Inc.), Azosol Brilliant Blue B (GAF), Azosol Brilliant Green BA (GAF), Azosol Fast Brilliant Red B (GAF), Azosol Fast Orange RA Conc. (GAF), Azosol Fast Yellow GRA Conc. (GAF), Basic Black KMPA (GAF), Benzofix Black CW-CF (GAF), Cellitazol BNFV Ex Soluble CF (GAF), Celliton Fast Blue AF Ex Conc (GAF), Cyper Black IA (GAF), Diamine Black CAP Ex Conc (GAF), Diamond Black EAN Hi Con. CF (GAF), Diamond Black PBBA Ex (GAF); Direct Deep Black EA Ex CF (GAF), Hansa Yellow G (GAF); Indanthrene Black BBK Powd. (GAF), Indocarbon CLGS Conc. CF (GAF), Katigen Deep Black NND Hi Conc. CF (GAF), Rapidogen Black 3 G (GAF), Sulphone Cyanine Black BA-CF (GAF), Zambezi Black VD Ex Conc. (GAF), Rubanox Red CP-1495 (Sherwin-Williams), Raven 11 (Columbian Carbon Company), Statex B-12 (Columbian Carbon Co.), chrome green, Peacock Blue Lake (Cl Pigment Blue 24), Persian Orange (lake of Cl Acid Orange 7), Black M Toner (GAF), and the like, as well as mixtures thereof. Also suitable are dyed particles and pigment/polymer composites; examples of suitable polymers for these types of particles include those listed hereinabove as being suitable for polymeric particles containing the photochromic spiropyran. The optional second-color particles may be contained in the electrophoretic ink in any amount effective to impart to the electrophoretic ink the desired color and intensity under the appropriate light conditions. Typically, the optional additional particles are present in the electrophoretic ink in an amount of at least about 1 percent by weight of the electrophoretic ink, and optionally at least about 5 to about 10 percent by weight of the electrophoretic ink, and optionally in an amount of no more than about 20 percent by weight of the electrophoretic ink, and in an embodiment no more than about 10 percent by weight of the Various aspects of embodiments disclosed will be illustrated with reference to the following non-limiting examples.

EXAMPLE 1

This example illustrates a method for making electrophoretic caps in a shell using heat generated from a chemical reaction to fuse suspended electrophoretic particles in a capsule together.

Microcapsules containing a one-particle electrophoretic ink were blended with Sartomer resin CN963A80, (an aliphatic polyester based urethane diacrylate oligomer (80%) in tripropylene glycol diacrylate) diluted further with more tripropylene glycol diacrylate (SR306) to achieve the desired viscosity. The photoinitiator employed was 2,4,6-trimethylbenzoyldiphenylphosphine oxide (Lucirin TPO). A ratio of 50% solids loading of capsules/resin was used. The resultant slurry was sandwiched between two ITO Mylar sheets and irradiated with UV light from a high intensity mercury vapor lamp (UV Fusion D-lamp). The assembled film was irradiated several times to complete the particle annealing. FIG. 4 illustrates annealed electrophoretic particles embedded in the resin. The wavelengths of exposure ranged from about 200 to about 420 nm. The lower limit was determined by the transmittance of quartz, as most UV sources are quartz bulbs. The exposure time was from about 0.2 to about 5 seconds. There were no heat controls on the exposure apparatus other than rapidly circulating air. The type of lamp used, a UV fusion D bulb (or iron doped mercury lamp) does produce significant amounts of infrared radiation and thus may be capable of heating the substrate particularly at the relatively long exposure times used here.

Although the disclosure has provided considerable detail with reference to certain preferred embodiments thereof, other versions are possible. Therefore the spirit and scope of the appended claims should not be limited to the description and the preferred versions contain within this specification.

What is claimed is:

1. An article comprising:
a cap of electrophoretic material suspended in a dielectric fluid; wherein the cap of electrophoretic material includes a substance that has a glass transition temperature of about 75° C. or less; wherein the cap of electrophoretic material and dielectric fluid are encapsulated in a shell, the cap comprising a plurality of melted electrophoretic particles fused together to have a continuous surface; wherein a portion of the cap of electrophoretic material is proximate to a viewable portion of an inner surface of the shell when the potential of an electrode near the shell attracts the cap of electrophoretic material to the viewable portion of an inner surface of the shell.

2. The article of claim 1 where the cap of electrophoretic material moves in the shell in response to a change in the polarity of an external electric field applied to the shell.

3. The article of claim 1 where the cap of electrophoretic material conforms to a portion of the inner shape of the shell.

4. The article of claim 1 where the cap of electrophoretic material in the capsule is nearly neutrally buoyant in the dielectric fluid.

5. A method of treating capsules that include visible electrophoretic particles in a dielectric fluid comprising:
melting visible electrophoretic particles in dielectric fluid within a capsule to form a cap that covers a portion of an inner surface of the capsule; wherein the electrophoretic particles are melted together by thermally annealing the electrophoretic particles together, wherein the electrophoretic include a thermoplastic material with a glass transition temperature of less than about 75° C.; wherein the melted electrophoretic particles fuse together to have a continuous surface.

6. The method of claim 5 where the electrophoretic particles are melted together by thermally annealing the electrophoretic particles together.

7. The method of claim 5 where the electrophoretic particles include a pigment.

8. The method of claim 5 where the cap is essentially neutrally buoyant in the dielectric fluid.

9. The method of claim 5 where the cap is essentially neutrally buoyant in the dielectric fluid.

10. The method of claim 5 where the electrophoretic particles are less than about 50 microns in size.

11. The method of claim 5 further including sandwiching between two electrodes the capsules that include visible electrophoretic particles in a dielectric fluid and a substance capable of generating heat to melt the electrophoretic particles inside each capsule together.

12. The method of claim 11 where one of the electrodes is transparent.

13. The method of claim 11 where the substance generates heat by a polymerization reaction.

14. The method of claim 11 where the electrophoretic particles are less than about 50 microns in size.

15. The article of claim 1, wherein the dielectric fluid is selected from the group consisting of aliphatic hydrocarbons, paraffinic hydrocarbons, isoparaffinic hydrocarbons, aromatic hydrocarbons, halogenated hydrocarbons, siloxanes, and mixtures thereof.

* * * * *